March 22, 1938.　　　　C. H. HINCKLEY　　　　2,111,930
HYDRAULIC BRAKE CONNECTION
Filed May 6, 1937
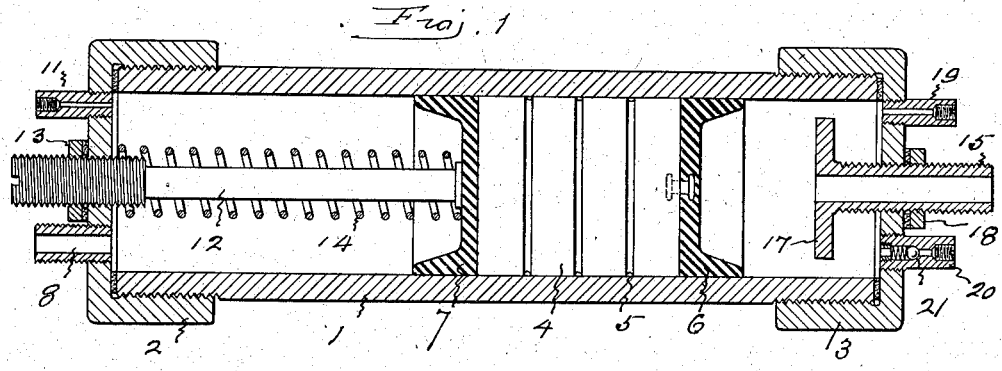
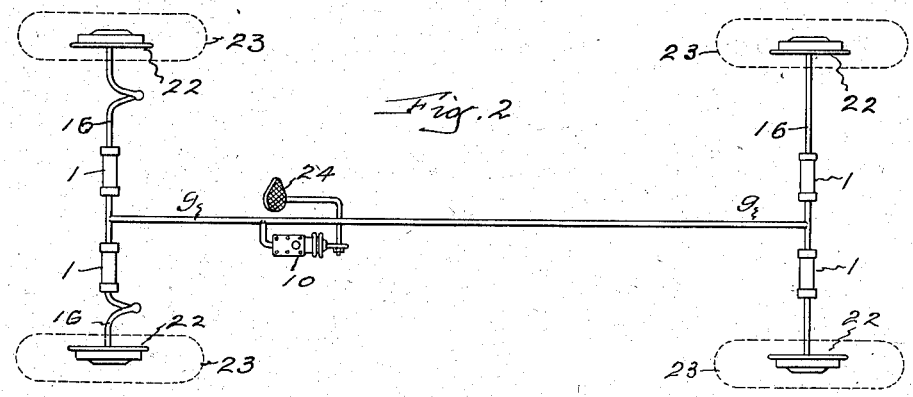
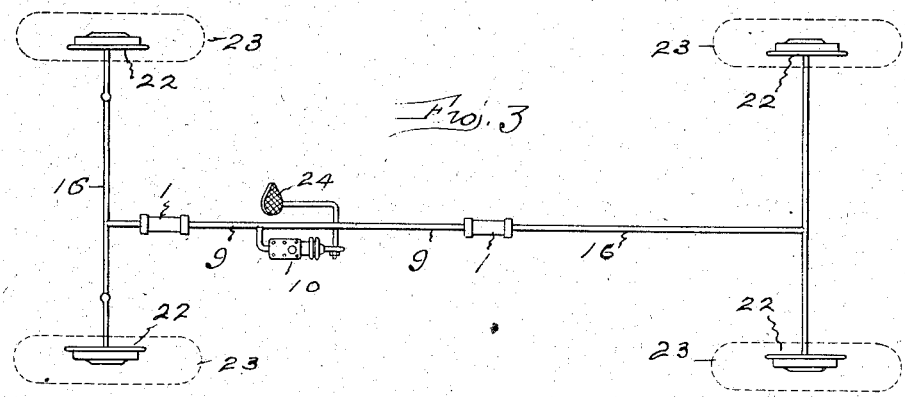
INVENTOR
Charles H. Hinckley
by
Harry P. Williams atty.

Patented Mar. 22, 1938

2,111,930

UNITED STATES PATENT OFFICE 2,111,930

HYDRAULIC BRAKE CONNECTION

Charles H. Hinckley, Oakville, Conn.

Application May 6, 1937, Serial No. 141,073

4 Claims. (Cl. 303—84)

This invention relates to the connections that are between the actuating pedal and the brake cylinders of four-wheel automobile brake systems.

The object of the invention is to provide a simple and inexpensive means that may be easily and quickly inserted by any mechanic in the fluid connections of a new or an old automobile, between a pedal operated master cylinder and the brake cylinder of each wheel, which means on the failure of a brake at any wheel owing to leakage of fluid, will isolate the brake of that wheel without interfering with the effectiveness of the brakes of the other wheels.

This object is attained in the embodiment of the invention illustrated, by inserting in the fluid connection between the brake cylinder of each wheel and the master cylinder, a cylinder containing a piston valve which at all times separates the fluid in the connection to the brake cylinder from the fluid in the connection to the master cylinder, and which during normal proper action transmits fluid pressure from one connection to the other, in one direction when the brake is to be applied and the opposite direction when the brake is to be released. However, if any leakage occurs from the brake cylinder or from the connection leading from the brake cylinder to the valve, the valve closes all communication with that connection so that no fluid can leak from the master cylinder connection past the valve.

In the accompanying drawing Fig. 1 shows a central longitudinal section of a piston valve designed to be used in accordance with the present invention.

Fig. 2 is a diagrammatic view showing a piston valve located between the master cylinder and each of four wheels of an automobile.

Fig. 3 is a similar view showing a piston valve arranged between the master cylinder and each pair of wheels of an automobile.

The valve illustrated comprises a cylinder 1 with its ends closed by heads 2, 3. Fitted closely in and movable longitudinally of the cylinder is a piston 4 with suitable lubricant grooves 5. Attached to one end of the piston is a cup-shaped packing 6, preferably rubber, and at the other end of the piston is a cup-shaped packing 7, preferably rubber.

The head 2 has a nipple 8 which is designed to be connected with the duct 9 from the master cylinder 10. This head also has a nipple 11 which can be vented to allow the escape of air as fluid is filled into this end of the cylinder. A stem 12 is threaded through the head 2 to provide an adjustable stop for the piston when it is moved toward this head. A clamping nut 13 is threaded on the outer end of the stem for holding the stem in the position to which it is adjusted. Surrounding the stem and exerting tension between the head 2 and the cup packing 7 is a spring 14.

A nipple 15 is threaded through the head 3. This nipple is designed to be connected with a duct 16 which communicates with a brake cylinder. The inner end of this nipple has a flange 17 which acts as a valve seat when the cup-packing 6 is forced against it. A nut 18 is arranged to clamp this nipple in place after it has been properly adjusted. The head 3 has an air venting nipple 19 and a nipple 20 with a spring closed ball valve 21 through which fluid may be forced to fill this end of the cylinder.

One of these piston valves 1 may be connected in the fluid conduit between the master cylinder 10 and the brake 22 at each of the four wheels 23, as diagrammatically illustrated in Fig. 2, or one may be connected in the fluid conduit from the master cylinder to each pair of wheels, as diagrammatically illustrated in Fig. 3.

With the system filled with fluid, pressure on the regular foot pedal 24 generates pressure in the master cylinder 10 and this pressure being transmitted through the conduit 9 and nipples 8 into the cylinders 1 causes the pistons to move and force fluid through the nipples 15 to the brake cylinders. On release of the pedal the forces are reversed and the pistons return to normal position.

If at any time there is a leakage of fluid at a brake cylinder or in a connection between a brake cylinder and the valve that guards it, so that that brake will be ineffective, when the pedal is depressed the piston in that valve will be forced forward and its packing 6 will seat against the flange 17 and close the outflow nipple 15. With the pressure reduced by leakage, the spring 14 holds the packing seated. The pistons fit closely in the cylinders and the cup packings are not only positioned to act most efficiently on the pistons but they eliminate liability of fluid leaking from the master supply past the pistons. However, should any such leakage occur fluid will not be able to pass a seated cup packing and escape through the outlet to the leaky brake cylinder.

These valves, which are simple and cheap to manufacture and install, may be inserted in the connections during building of a new car, or the fluid conduits of a car already built may be easily cut and the valves quickly connected without altering any part of the car or brake system. No special master cylinder is necessary, as there is no direct mechanical connection of the valves to the mechanism of the master cylinder, and no particular brakes are required.

The invention is:—

1. In an automobile hydraulic brake system a master cylinder containing fluid and a brake cylinder containing fluid, a valve having in one end an opening in fluid connection with the master cylinder and having in the opposite end an opening in fluid connection with the brake cylinder, said valve containing a piston with one end exposed to master cylinder pressure and the other end exposed to brake cylinder pressure, said piston at all times completely isolating fluid communication from the master cylinder to the brake cylinder but movable to transmit master cylinder pressure to the brake cylinder when the cylinders are filled with fluid and movable to close the opening in fluid connection with the brake cylinder upon reduction of fluid pressure in the brake cylinder, and a spring thrusting against the piston in the direction of the master cylinder pressure for holding the piston closed upon reduction of fluid pressure in the brake cylinder.

2. In an automobile hydraulic brake system a master cylinder containing fluid and a brake cylinder containing fluid, a valve having at one end a head with an opening in fluid connection with the master cylinder and having at the opposite end a head with an opening in fluid connection with the brake cylinder, said valve containing a piston provided at one end with an elastic cup that is exposed to master cylinder pressure and provided at the other end with an elastic cup that is exposed to brake cylinder pressure, said piston at all times completely isolating fluid communication from the master cylinder to the brake cylinder but movable to transmit master cylinder pressure to the brake cylinder when the cylinders are filled with fluid and movable to cause the latter cup to close the opening in fluid connection with the brake cylinder upon reduction of fluid pressure in the brake cylinder, and a spring thrusting against the former cup in the direction of the master cylinder pressure for holding the latter cup closed upon reduction of pressure in the brake cylinder.

3. In an automobile hydraulic brake system, a master cylinder containing fluid and a brake cylinder containing fluid, a valve having at one end a detachable head supporting a nipple with an opening in fluid connection with the master cylinder and having at the opposite end a detachable head supporting a nipple with an opening in fluid connection with the brake cylinder, said latter nipple being threaded through the latter head and having a flange at its inner end, said valve containing a piston that has one end exposed to master cylinder pressure and the other end exposed to brake cylinder pressure and is movable to transmit master cylinder pressure to the brake cylinder when the cylinders are filled with fluid and further movable to seat upon said flange and close the opening in the fluid connection with the brake cylinder upon leakage of fluid from the brake cylinder, and a spring thrusting against the piston in the direction of master cylinder pressure for causing the piston to remain seated upon said flange upon reduction of fluid pressure in the brake cylinder.

4. In an automobile hydraulic brake system a master cylinder containing fluid and a brake cylinder containing fluid, a valve comprising a cylindrical casing having detachable heads and a piston adapted to reciprocate in said casing, one head supporting a nipple that has an opening in fluid connection with the master cylinder, also an adjustable stop stem, and the other head supporting an adjustable nipple that has a flanged inner end with an opening in fluid connection with the brake cylinder, said piston being movable from said stop stem to transmit master cylinder pressure to the brake cylinder when the cylinders are filled with fluid and further movable to cause the piston to seat upon said flange and close the opening in the fluid connection with the brake cylinder, upon leakage of fluid from the brake cylinder, and a spring surrounding said stop stem and thrusting against the piston in the direction of master cylinder pressure for causing the piston to remain seated upon said flange upon reduction of fluid pressure in the brake cylinder.

CHARLES H. HINCKLEY.